No. 785,884. PATENTED MAR. 28, 1905.
T. S. HUNTINGTON
ROTARY ENGINE.
APPLICATION FILED APR. 5, 1902. RENEWED AUG. 25, 1904.

7 SHEETS—SHEET 1.

WITNESSES:
F. N. Roehrich
John O. Gimpler.

INVENTOR
Thomas S. Huntington
BY
Pennington Halsted
his ATTORNEY

No. 785,884. PATENTED MAR. 28, 1905.
T. S. HUNTINGTON.
ROTARY ENGINE.
APPLICATION FILED APR. 5, 1902. RENEWED AUG. 25, 1904.

7 SHEETS—SHEET 2.

WITNESSES:
F. N. Roehrich
John O. Gempler

INVENTOR
Thomas S. Huntington
BY Pennington Halsted
his ATTORNEY

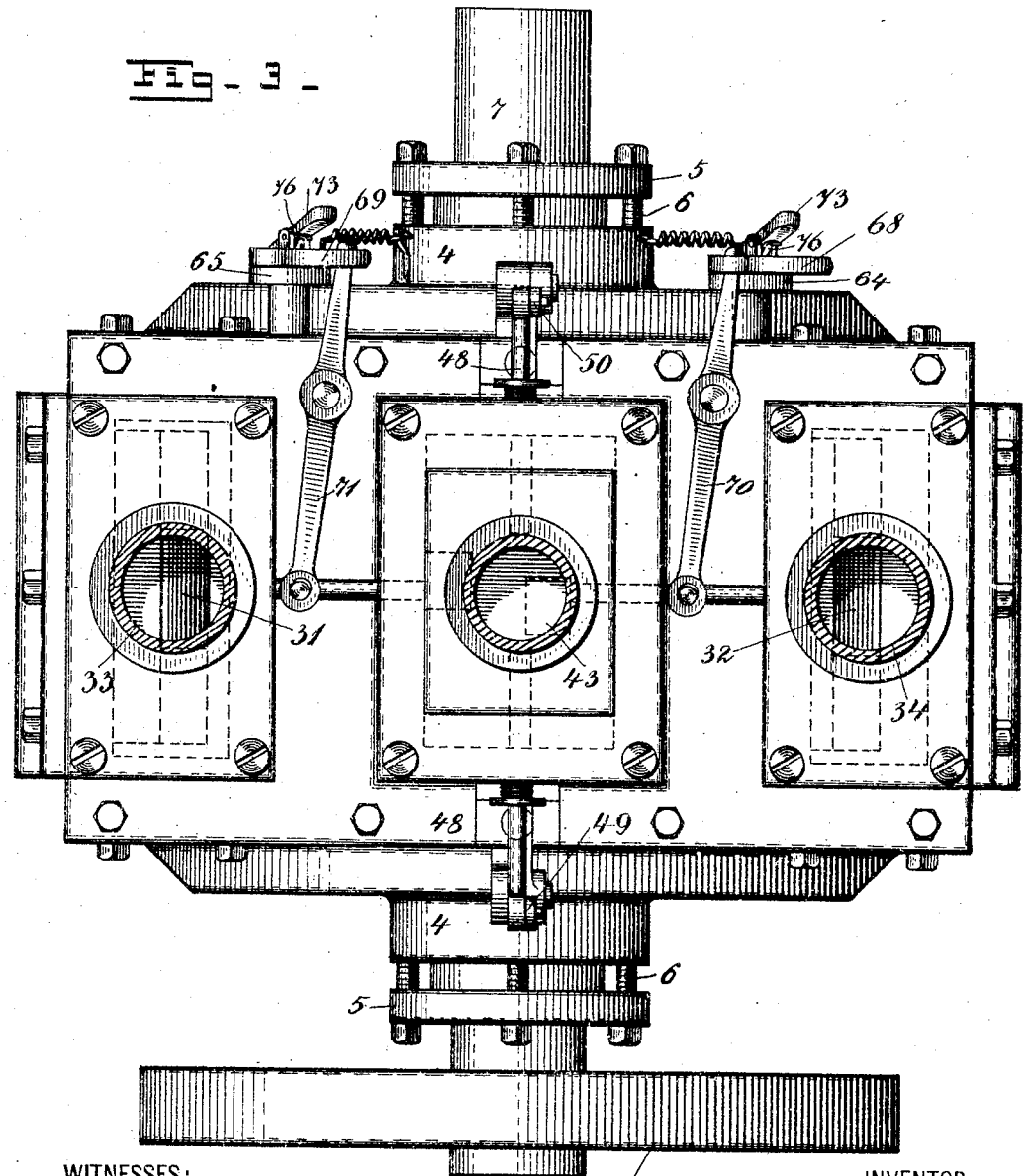

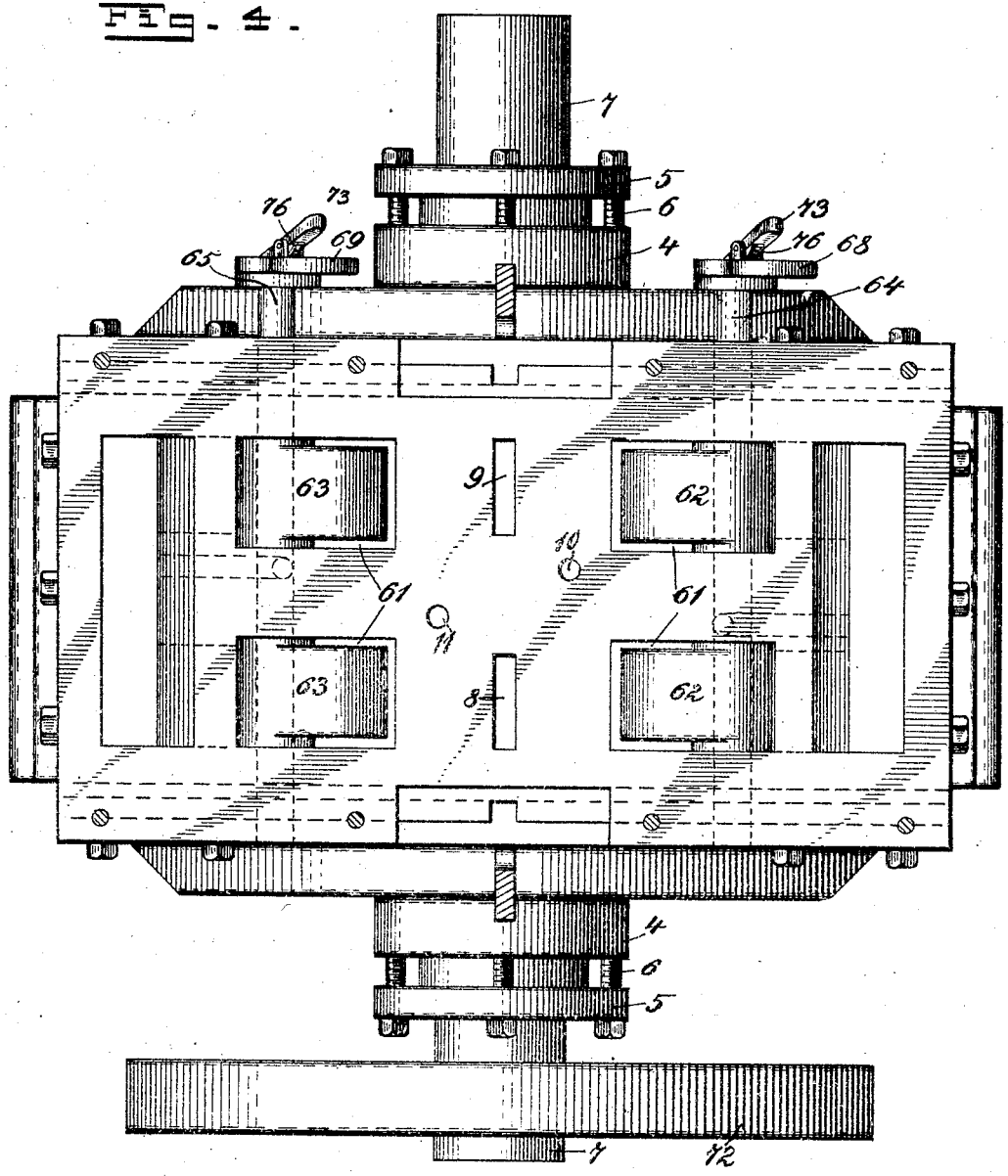

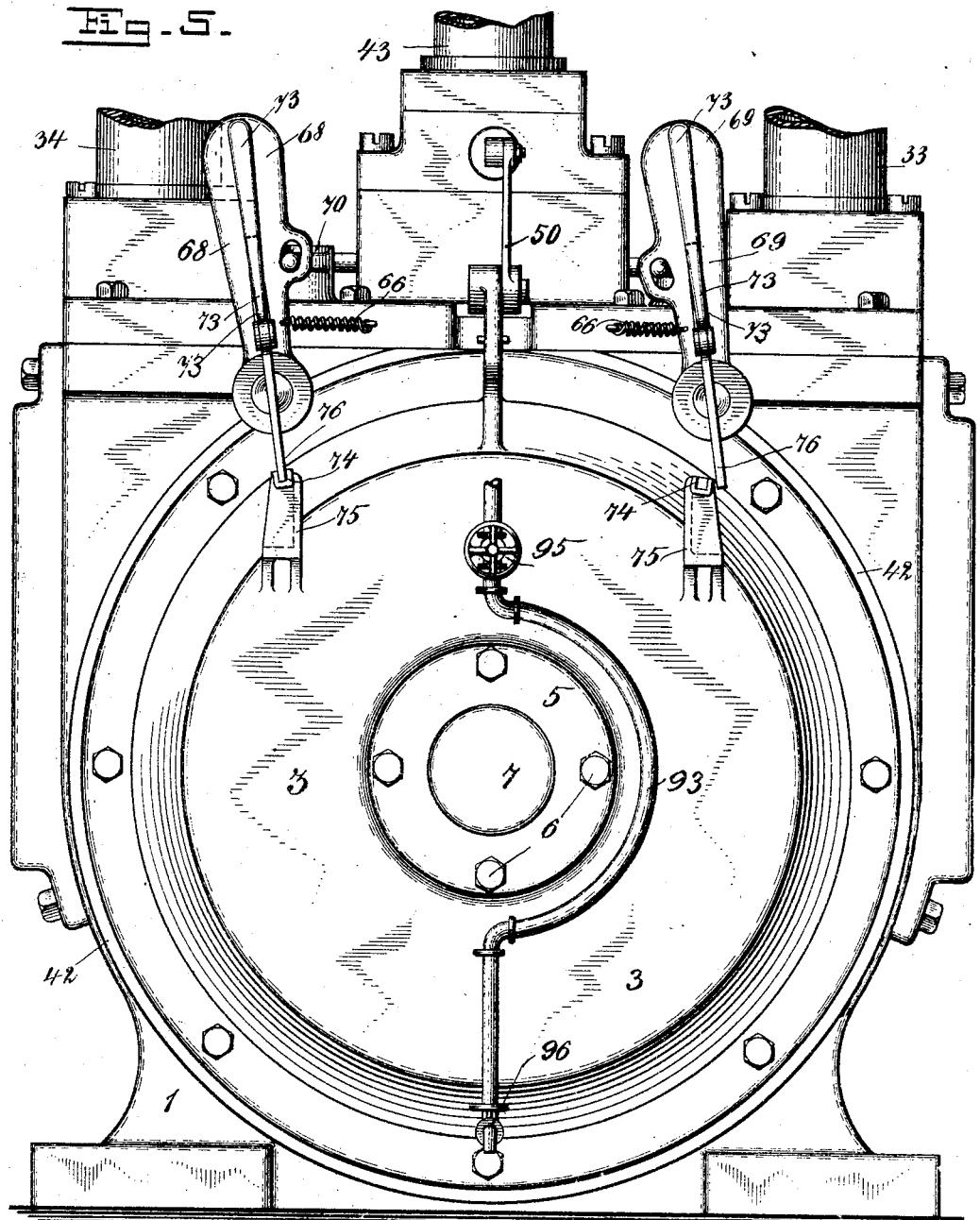

No. 785,884. PATENTED MAR. 28, 1905.
T. S. HUNTINGTON.
ROTARY ENGINE.
APPLICATION FILED APR. 5, 1902. RENEWED AUG. 25, 1904.
7 SHEETS—SHEET 6.
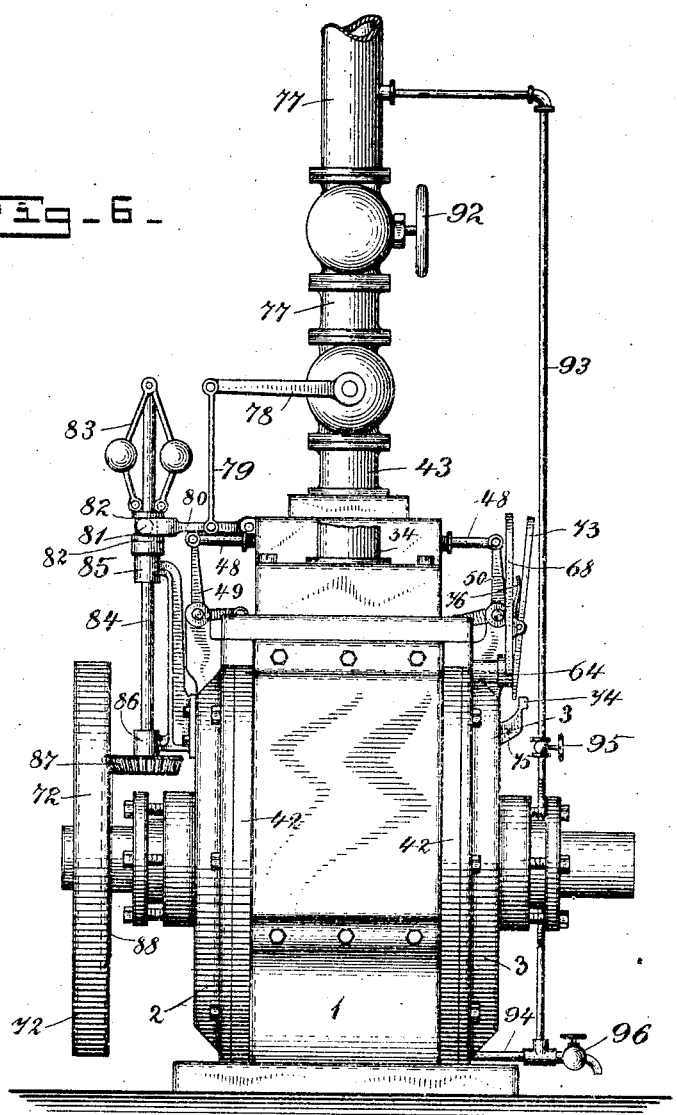
WITNESSES:
F. N. Roehrich
John O. Gimpler
INVENTOR
Thomas S. Huntington
BY
Pennington Halsted
his ATTORNEY No. 785,884. PATENTED MAR. 28, 1905.
T. S. HUNTINGTON.
ROTARY ENGINE.
APPLICATION FILED APR. 5, 1902; RENEWED AUG. 25, 1904.
7 SHEETS—SHEET 7.
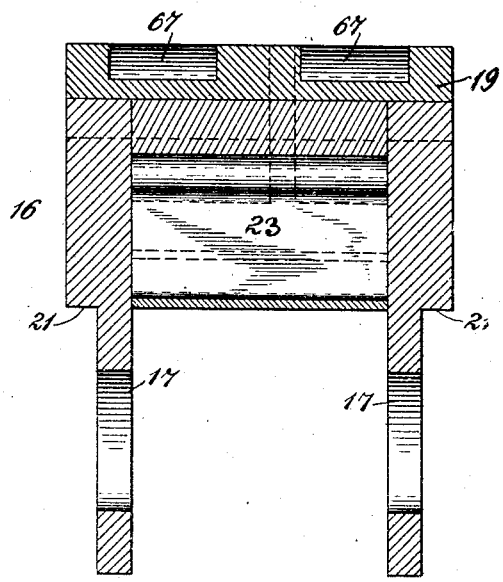
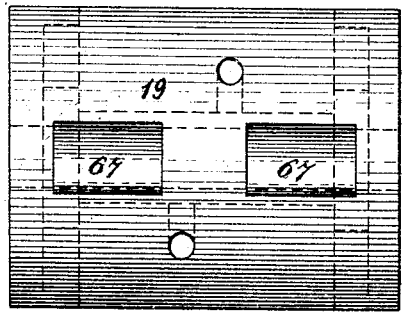
WITNESSES:
F. N. Roehrich
John O. Gempler
INVENTOR
Thomas S. Huntington
BY
Pennington Halsted
his ATTORNEY No. 785,884.

Patented March 28, 1905.

UNITED STATES PATENT OFFICE.

THOMAS S. HUNTINGTON, OF NEW YORK, N. Y., ASSIGNOR, BY DIRECT AND MESNE ASSIGNMENTS, OF ONE-THIRD TO JOHN P. MUNN, OF NEW YORK, N. Y., AND ONE-THIRD TO HOWARD A. PARDEE, OF NEW YORK, N. Y.

ROTARY ENGINE.

SPECIFICATION forming part of Letters Patent No. 785,884, dated March 28, 1905.

Application filed April 5, 1902. Renewed August 25, 1904. Serial No. 222,109.

*To all whom it may concern:*

Be it known that I, THOMAS S. HUNTINGTON, a citizen of the United States, residing in the borough of Manhattan, city of New York, and State of New York, have invented certain new and useful Improvements in Rotary Engines, of which the following is a specification.

My invention relates to rotary engines; and its principal object is to provide means whereby the rotary pistons and the shaft will be caused to revolve freely and uniformly and with a minimum of resistance.

My invention consists generally of certain features, parts, and combinations of parts, as herein described.

The accompanying drawings illustrate one embodiment of invention, in which—

Figure 1:
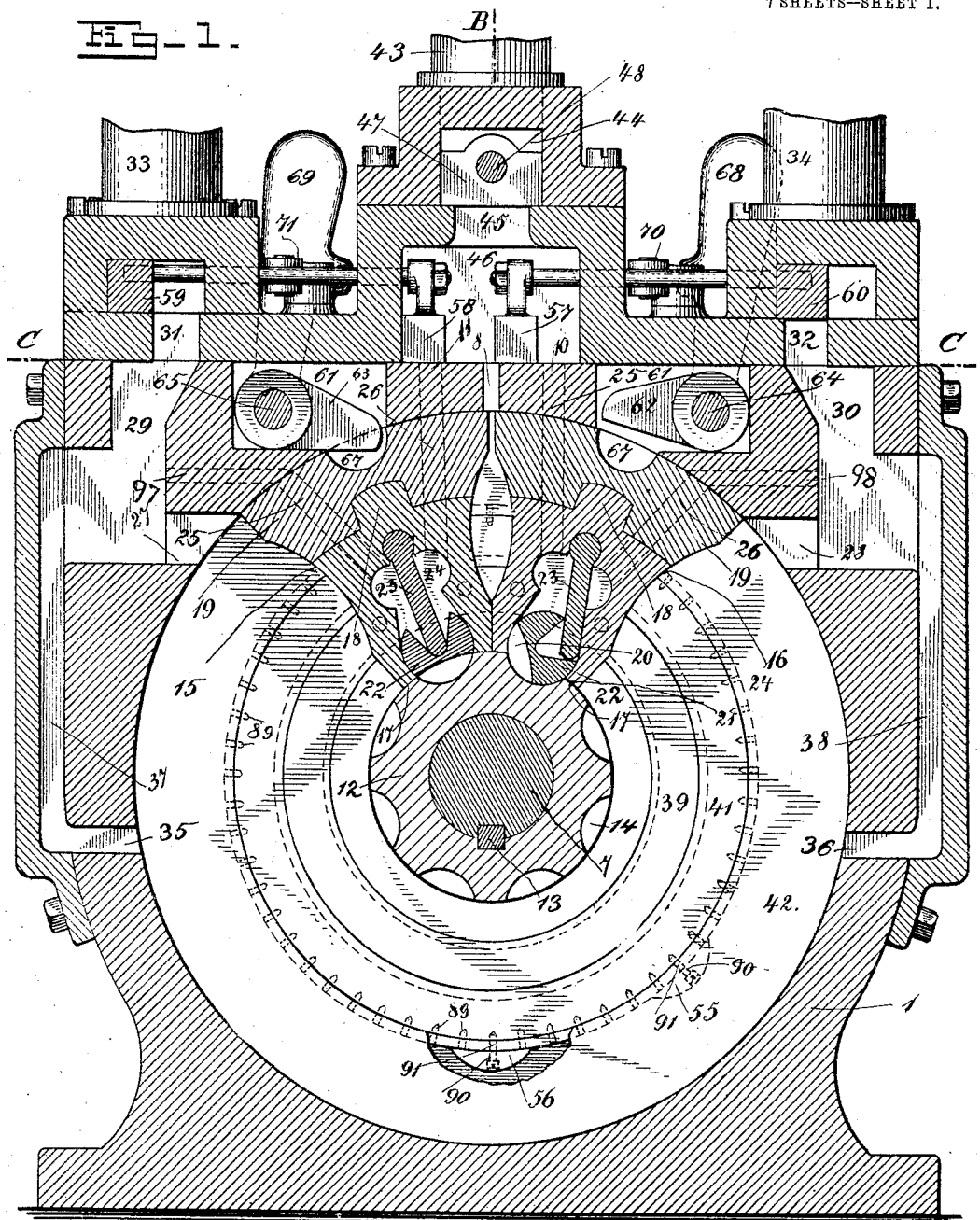
Figure 2:
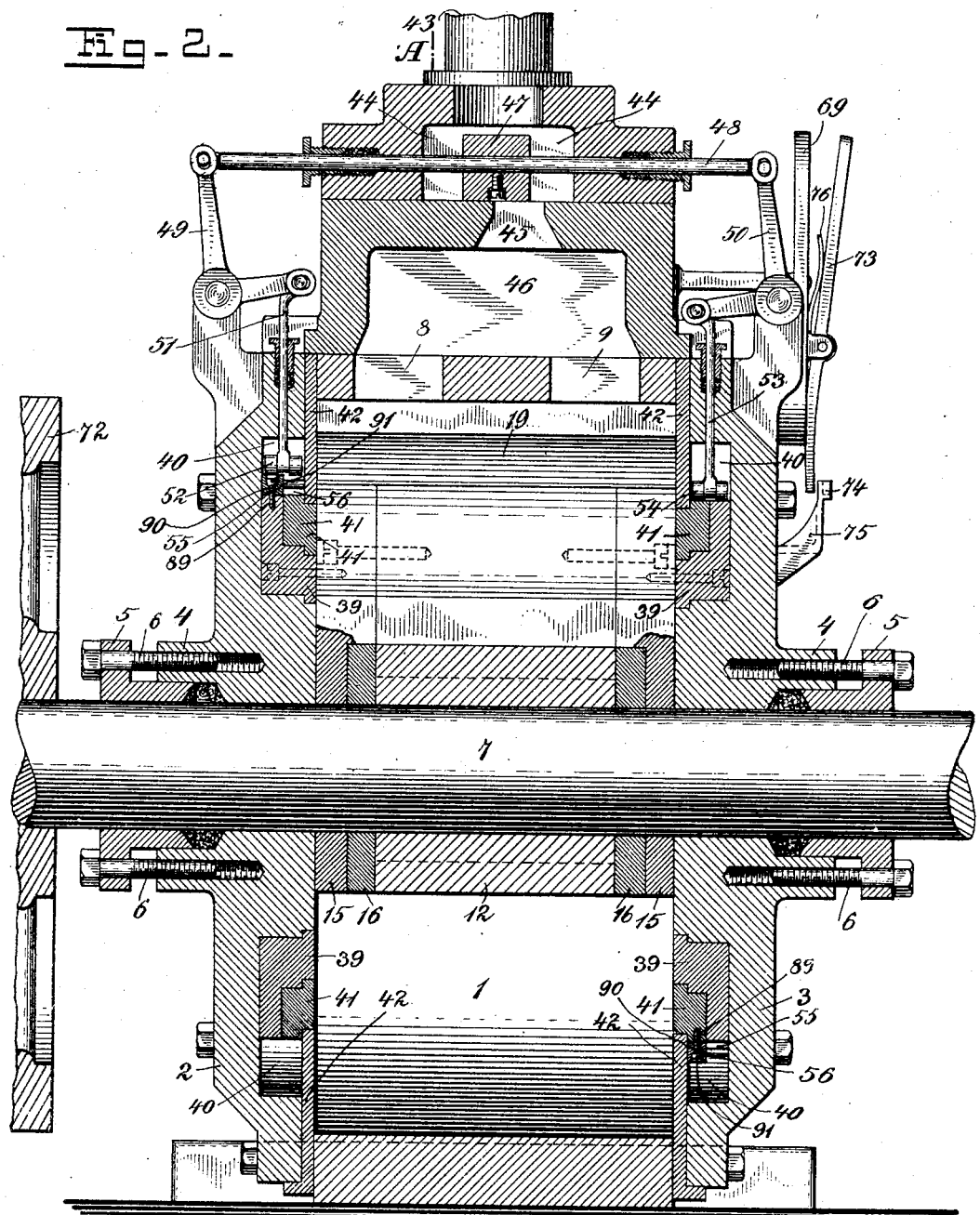

Figure 1 is a transverse section through the cylinder and the shaft and through line A A of Fig. 2. Fig. 2 is a central longitudinal section as shown through line B B of Fig. 1. Fig. 3 is a top plan. Fig. 4 is a horizontal section through the line C C of Fig. 1. Fig. 5 is a front elevation. Fig. 6 is a side elevation on a reduced scale from that shown in the preceding figures and also showing a complete rotary engine. Figs. 7 and 8 are a vertical section and a plan view, respectively, of one of the rotary pistons.

Similar numbers indicate like parts in all the figures.

1 represents the casing of the engine, having a cylindrical chamber, and which casing is usually called the "engine-cylinder."

2 and 3 are the cylinder-heads, which are secured to the opposite ends of the cylinder or casing by bolts or otherwise in the usual manner. Each head 2 is provided on its exterior and in the center of the same with a recess 4, and in these recesses stuffing-boxes 5 are inserted, which are secured to the heads 2 by screws or bolts 6.

7 is the main shaft of the engine, which passes through and is journaled in the centers of the heads 2 and the stuffing-boxes 5. Extending through the upper side of the cylinder 1 are two oblong ports 8 and 9 for the introduction of steam, compressed air, or other elastic fluid.

10 and 11 are two small exhaust-ports extending through the top of the cylinder or casing 1 and which are not on a line, either longitudinally or transversely, with the inlet-ports 8 and 9. 12 is a sleeve surrounding and shrunk upon or otherwise held to the shaft 7—as, for example, by a key 13.

14 represents a series of longitudinal curved grooves on the periphery of the sleeve 12.

15 and 16 represent radially-moving wing-shaped pistons each of which is provided with two legs or extensions having transverse holes 17, through which loosely passes the shaft 7 in such manner as to permit the pistons to revolve loosely upon the shaft. These pistons are somewhat triangular in shape, as will be seen by reference to Fig. 1, with the curved base of the pistons bearing upon the inner periphery of the cylinder. The pistons are preferably made in two parts, the inner part having a longitudinal extension 18, which fits into a corresponding recess on the inner side of the outer part 19 of the piston. The inner part of each of these pistons is also provided with a recess 20, which is adjacent to the sleeve 12, so that when the shoulders 21, where the legs of the piston join to the other part, bear upon the periphery of the sleeve 12 a chamber is formed by the walls of said recess 20 and the periphery of said sleeve.

22 is a locking-piece of peculiar construction. This locking-piece is of the same length as the upper part of the pistons 15 16 and is adapted to rest upon and ride over the periphery of the sleeve 12, and consequently is concaved on one side to conform with the convexity of said sleeve. The lower portions of the walls of the recesses 20 are curved, and the outer sides of the locking-pieces 22 are correspondingly curved in a convex form and are adapted to ride over the said walls. These locking-pieces may then roll from the walls of the recesses 20 into the longitudinal grooves 14 on the sleeve 12, so that they may lock the pistons to said sleeve, or when turned so that their concave surface is in conformity with the periphery of the sleeve 12 they will be unlocked from said sleeve and can be turned freely thereon.

23 is a swinging or pivotal gate having its pivot or fulcrum just beyond the outer end of the recess 20. The free end of said gate enters and is adapted to engage with a triangular recess 24 in the locking-piece 22 in such manner that when said locking-piece is unlocked from the sleeve 12 the free end of the gate 23 will be at the apex or bottom of said recess, as will be seen in Fig. 1 in the left piston 16, and when the locking-piece is turned so as to lock the piston to the sleeve 12 the free end of the gate 23 will rest upon the side of the recess 24, as will be shown in the right piston 15 in Fig. 1.

By referring to Fig. 2 it will be seen that there are two outwardly-extending shoulders where the pivotal part of said piston joins to the other part. This pivotal part or the legs of the piston 15 bear against the outside of the legs of the piston 16 and will permit the legs of both of said pistons to ride over each other; but the shoulders 21 will form abutments to prevent the outer portions of the pistons from either riding upon or passing each other. They will, in fact, cause said portions to meet, as is shown in Fig. 1. Each of the pistons 15 and 16 is provided with two small ports 25 26, passing from the recess 21 on opposite sides, respectively, of the gate 23 to the outer curved surfaces of the pistons. These ports are adapted to register during certain portions of their revolutions with the inlet-ports 10 and 11.

27 and 28 are exhaust-passages opening from the interior of the cylinder into exhaust-chambers 29 and 30, respectively. These chambers are provided with outlet-ports 31 and 32, respectively, and beyond and above these ports are exhaust-outlets 33 and 34. On opposite sides of the cylinder are exhaust-ports 35 and 36, which communicate, respectively, with passages 37 and 38, the passage 37 passing from the port 35 to the chamber 27 and the passage 38 passing from the port 36 to the chamber 28.

39 39 are two rings which are secured on opposite sides of the piston 15 and which rest in annular grooves or recesses 40 40 in the two piston-heads 2 3. (See Fig. 1.) These recesses 40 should be of the same depth as the width of the rings 39 in order that said rings may revolve within the inner plane of said heads, so that there shall be no obstruction in the way of the elastic fluid or of the revolving pistons. The object of these rings is to provide a steadier and firmer bearing for the pistons during their revolution, for if only the legs of the pistons were relied upon to support them there would be too much leverage and strain upon them, and they would be apt to be forced or wrenched out of their proper positions. These rings by being provided with annular grooved bearings in the piston-heads serve to give a firm and steady bearing for the pistons during their revolutions. The piston 16 is provided with somewhat similar rings 41, which are secured to said piston and rest and move in grooves in the rings 39, as will be seen in Fig. 2.

42 42 are ring-shaped washers inserted between the two heads 2 and 3 and the cylinder 1, and the annular inner edge of said washers serving as a bearing for the outer shouldered edge of the rings 41.

The upper part of the cylinder or casing 1 is provided with an inlet-opening 43 for steam, condensed air, or other elastic fluid, and this inlet 43 opens into a chamber 44, and below this chamber is an inlet-port 45, which opens into a larger chamber 46, into which the inlet-ports 8 and 9 open.

47 is a slide-valve inclosed in the chamber 44 and adapted to open and close the port 45. This valve is connected to a horizontal reciprocating rod 48, passing through the walls of the chamber 44 and through stuffing-boxes in said walls. Each end of said rod 48 is connected with one arm of a bell-crank lever, one of these levers, 49, being on one side of the cylinder and the other lever, 50, being on the opposite side of the cylinder. The arm of the lever 49 that is not connected with the rod 48 is pivotally connected to a rod 51, which passes loosely through a stuffing-box and the edge of one of the heads 2 into the recess 40, where it is provided with a cross-bar 52. A similar rod 53 is connected with the lever 50 and has a similar cross-bar 54 on its lower end in the recess 40 of the opposite head 3. The rings 39 and 41 are provided with swelled portions or cams 55 and 56, respectively, which when they get around to the point of the cross-bars 52 or 54 will bear on the inner side of said cross-bars and press up their corresponding rods, and thus operate the levers 49 and 50 to move the rod 48 so as to open or close the inlet-passage 45 by the valve 47. When the parts are in the positions shown in Figs. 1 and 2, the steam or other elastic fluid can enter the inlet 43, pass down through the chamber 44 and port 45, chamber 46 and ports 8 and 9, into the cylinder and between the pistons 15 and 16. At this time it will be seen that the port 45 will be open, the cam 55 having raised the bar 51, so as to move the valve 47 to open said port 45. The periphery of the ring 39 is also provided with a similar cam to raise the rod 48 and move the lever 50 and rod 48 in the opposite direction, so as to move the valve 47 to close the port 45. This cam may be located upon the ring 39 at whatever point it is desired during the course of the piston to close the valve and to shut off all entrance for the steam or other elastic fluid, so that the elastic or expansible property of the fluid will have an opportunity to work. The rings 41, which are secured to the piston 16, are also provided with similar cams 56 for a similar purpose.

57 and 58 are valves inclosed in the chamber 46 and are adapted to open and close, respectively, the ports 10 and 11. 59 and 60 are similar valves adapted to open and close the exhaust-ports 31 and 32, respectively. The valves 57 and 60 are connected by a rod, so that they will move in unison, and the valves 58 and 59 are also connected with a rod, so that they will also move in unison. These valves are so connected that when the valve 58 has closed the port 11 the valve 59 will have opened the exhaust-port 31 and when the valve 57 has closed the port 10 the valve 60 will have opened the port 32.

The top of the cylinder-casing is provided with four similar recesses 61, in which are pivoted locking-dogs 62 and 63. The dogs 62 are both pivoted or fulcrumed to the same rock-shaft 64, and the dogs 63 are correspondingly fulcrumed to the same rock-shaft 65.

66 represents springs which tend to bear the dogs 62 and 63 downward. The recesses 61 are provided with openings under the free ends of the dogs 62 and 63 and extending into the interior of the cylinder. The broad outer curved sides of the pistons 15 and 16 are provided with depressions 67, which are adapted to register with the free ends of the dogs 62 and 63, so that when the ends of said dogs drop into said depressions 67 the pistons will be locked and be prevented from turning; but when such dogs are free from the depressions 67 the pistons will be unlocked and be free to turn. Extending upward from the rock-shaft 64 is a hand-lever 68, and extending upward from the rod 65 is a similar hand-lever 69.

70 is a lever uniting the rod which connects the two valves 57 and 60 with the hand-lever 68, and 71 is a similar lever which unites the rod which connects the two valves 58 and 59 with the hand-lever 69. When the hand-lever 68 is turned to the right, it raises, by means of the rock-shaft 64, the dog 62 out of engagement with the depression 67 in the piston 16, and at the same time, through the lever 70, pushes the valve 57 to the left, so as to open the inlet-port 10 and close the outlet or exhaust port 32. When the dog 62 and the hand-lever 68 are moved to the left, so as to lock the piston, this operation will, through the lever 70, force the valves 57 and 60 to the right, so as to close the inlet-port 10 and open the exhaust or outlet port 32. A corresponding action will take place with the dog 63 and the valves 58 and 59 when the hand-lever 69 is moved to the left or right.

The shaft 7 is provided with an ordinary fly-wheel 72, secured to the same outside of one of the cylinder-heads.

Pivoted to the side of each of the hand-levers 68 and 69 is a light spring-lever 73, the lower end of which is adapted to engage with a notch 74 in an ear 75, cast upon the head 3. The spring 76 of said lever is inserted above the pivot of the same and tends to bear outward the upper arm of said lever, and consequently to bear inward its lower end. When either of the hand-levers 68 or 69 is moved in a direction away from the cylinder and so as to raise the dog 62 or 63, so as to release it from engagement with one of the depressions 67 in either of the pistons, the lower end of the lever 69 will be either in engagement with the notch 74 of the ear 75 or in a position to be engaged with said notch. When it is so engaged, it will be seen that the hand-lever 68 or 69 will be locked until it is released by hand. The dog 62 or 63 will be consequently locked in its raised and disengaged position, and the inlet-valve 10 or 11 will be opened for the admission of the steam or elastic fluid to the cylinder. The operation of grasping the hand-lever 68 or 69 will press the upper arm of the lever 73 toward said hand-lever, and thus release its lower end 76 from the notch 74 of the ear 75, so that said hand-lever 68 or 69 can be moved on its pivot. By thus pressing inward the upper arm of the lever 73 the lower arm will be forced outward, and then when the hand-lever 68 or 69 is moved in a direction away from the cylinder the lower end 76 of the lever 68 or 69 will ride partly over the ear 75 until it is opposite the notch 74. Then upon releasing the pressure on the upper arm of the lever 68 or 69 the spring will automatically force the lower end 76 of said lever into engagement with the notch 74, and thus lock it and the hand-lever 68 or 69 and dog 62 or 63 in their locked positions. The same pressure upon the lever 68 or 69 will cause their lower ends to be released from the notches 74, and when the hand is removed from said lever 68 or 69 the spring 66 will draw said hand-lever inward and force the dog 62 or 63 downward and into engagement with the depression 67 of the piston.

The inlet 43 to the chamber 44 is at the lower end of an inlet-pipe 77, and in said pipe 77 is an ordinary governor-valve (not shown) for regulating the admission of steam to the chamber 44. The operating-arm 78 of said valve is pivotally connected with the rod 79, the lower end of which is pivoted to a lever 80, the outer end of which is connected by a yoke 81 with the flanged lower sliding sleeve 82 of a governor 83. 84 is the vertical revolving shaft of this governor, which is journaled in brackets 85 and 86, secured to the head 2. The lower end of said shaft 84 is provided with a bevel-gear 87, which engages with another bevel-gear 88, secured on or integral with the fly-wheel 72.

The governor 83 serves to regulate the admission of steam and the consequent revolution of the pistons and the fly-wheel 72 in the following manner: When too much steam is admitted to the cylinder through the pipe 77 and inlet 43, the velocity of the fly-wheel 72 will, through the gears 88 and 87 and shaft 84, cause the governor to revolve rapidly, and consequently by the centrifugal action draw up the sleeve 82, lever 80, and rod 79, and raise the valve-arm 78, so as to somewhat close said valve and partly shut off the steam from the cylinder. The pistons will then be made to revolve more slowly and also the fly-wheel 72, when its velocity being less than it was before the sleeve 82 of the governor 83 will drop, as will also the lever 80, rod 79 and valve-arm 78, and open the valve again for the admission of more steam. This construction, which is a common one, will, as above stated and as is well known, regulate the admission of steam to the cylinder and regulate the velocity of the pistons.

The cams 55 and 56 are adjustable at any point on the peripheries of the rings 15 and 16 by means of a number of screw-threaded holes 89 in the peripheries of the rings and corresponding holes 90 through the cams, through which screws 91 may be made to pass and hold the cams in place, wherever desired, on the peripheries of the rings, the outer ends of the holes 90 in the cams being countersunk, so as to prevent the heads of the screws 91 extending beyond the surface of the cams. This construction will permit of the adjustability of the cams on the rings, so that they may be secured to said rings at the most desirable points for the operation of the opening and closing of the port 45 by the valve 47.

92 is a hand-valve in the pipe 77 above the governor-valve, and 93 is a small pipe leading from the inlet-pipe 77 and above the valve 92 to and into a small outlet-pipe 94, which enters the lower part of the cylinder 1.

95 is a hand-valve in the pipe 93, and 96 is a faucet for allowing the water of condensation to be withdrawn from the cylinder.

97 and 98 are exhaust-passages opening into the chambers 29 and 30, respectively, and with the inlet of which passages the passages 26 in the piston 15 and 16 register during a part of their revolutions.

The operation of the machine is as follows: If the parts are in the positions shown in Figs. 1 and 2 and steam is to operate the engine, the live steam is first admitted through the inlet 43 down through the chamber 44 (past the valve 47) and through the inlet 45 and chamber 46 through the oblong ports 8 and 9 between the two pistons 15 and 16. At the same time that the steam is entering through the ports 8 and 9 to the cylinder steam will also pass through the ports 10 and 25 into the recess 20 of the piston 16, and the pressure of the steam upon the gate 23 in said piston will turn the locking-piece 22, so as to lock the piston 16 with the sleeve 12 and shaft 7. The dogs 62 at this time will be raised from the depressions 67 in the piston 16, so that said piston will be unlocked from the casing and the exhaust-port 32 will be closed by the valve 60. The live steam that has entered through the inlet-ports 8 and 9 will drive the piston 16 to the right until it arrives at a point where one of the cams on the piston 16 will raise the rod 53 and through the lever 50 and the rod 48 move the valve 47 to close the port 45, and thus shut out the live steam from the entrance to the cylinder. The steam back of the piston 16 will then expand and continue to force said piston around the cylinder. When the piston has passed the port 35, the steam that has been operating the piston will be exhausted or pass out through the port 35 and passage-way 37, chamber 29, port 31, and outlet 33; but during such passage of the steam a little of it will pass from the chamber 29 back into the cylinder through the port 27, so as to form a cushion and prevent the piston 16 from striking the piston 15. The expansion of the steam will not carry the piston more than just beyond the port 35; but the velocity of the fly-wheel will carry said piston through the instrumentality of the shaft and the sleeve 12 the remainder of the distance until the piston 16 comes in contact with the piston 15. When the piston has arrived at the point where the port 25 of the same registers with the steam-exhaust port 97, leading into the chamber 29, the steam from the recess 20 will pass out through said port 97 and relieve the pressure on the gate 23. During the movement of the piston by the fly-wheel, the pressure caused by the steam on the gate 23 having been removed, the locking-piece by the revolution of the fly-wheel will be caused to resume its unlocked position and with the free end of the gate 23 resting in the bottom of the triangular recess in said locking-piece, and when this occurs the piston 16 will be unlocked from engagement with the sleeve 12. The rotation of the fly-wheel, however, will continue the course of the piston a little farther, sufficient to push the piston 15 forward to the position that the piston 16 had formerly occupied. When this takes place, one of the cams—say 55—on the piston 15 will raise the rod 51 (see Fig. 2) and through the instrumentality of the lever 49 and rod 48 will slide the valve 47 to open the port 45, so that the live steam may enter through said port and the chamber 47 and inlets 8 and 9 into the cylinder, when the action will be repeated upon the piston 15 that took place in regard to the piston 16. The piston 15 will then when it gets around to the point where it comes in contact with the piston 16 give such piston its initial movement and the operation will be repeated, said two pistons revolving around the cylinder alternately.

If it be desired to rotate the shaft by the pistons in the opposite direction, the handle 69 is turned to the left, so as to raise the dogs 63 from the depressions 67 in the pistons. The steam will enter the cylinder from the same inlet-ports 8 and 9, and the same operation will be repeated, except that the revolution will be in the opposite direction and the exhaust-steam will pass out through the passage-ways 36, 38, 30, 32, and 34 instead of through 35, 37, 29, 31, and 33. The exhaust from the recess 20 of the pistons passes out through the passages 26 and 98. By this moving of the hand-lever 69 to the left the valve 58 will be caused to move to the right, and thus open the inlet-port 11 for the admission of steam through the port 26 into the chamber 20 to the right of the gate 23, so as to force said gate to the left, and thus cause the locking-piece 22 to turn and lock the piston to the sleeve 12. While this valve 58 has opened the port 11, the exhaust-port 31 will be closed by the valve 59. The ring 39 of piston 15 is provided, as above stated, with two cams, one of which at the proper time when the piston has completed a certain part of its movement operates one of the rods 51 or 53 and through one of the bell-crank levers 49 or 50 the rod 48 to close the inlet-port 45 by the valve 47 and to shut off the steam from the cylinder, so that the steam which is in the cylinder will expand and force the piston around until it has passed the exhaust-port 36. The remainder of the operation has been already described. As hereinbefore stated, the dogs 62 and 63 are normally held down by means of springs. As will be seen in Fig. 1, one of the dogs 63 is shown in its downward position; but as the valves move to the right they will ride under said dog and its corresponding one back of it and not be locked by said dogs. The position, however, of said dogs will prevent the movement of the pistons in the opposite direction—that is, to the left—as the walls of the depression 67 will abut against the ends of the dogs 63. The positions of the parts shown in Fig. 1, therefore, are such that the pistons can only revolve from left to right. When the pistons are intended to revolve from right to left, the dogs 63 have to be raised, and to prevent the pistons being revolved in the opposite direction from left to right the dogs 62 are lowered, so that they will enter the depressions 67 in the pistons, and the ends of said dogs will form abutments or stops for the walls of said depressions. If there be any water of condensation in the cylinder, it may be drawn off by opening the faucet 96. The valve 92 should be closed until the engine is to be operated. When it is to be operated, the valve 95 should first be opened to allow steam to enter the cylinder 1 through pipes 93 and 94 to heat the interior of the cylinder, and about the same time the faucet 96 should be opened to draw off the water of condensation from the cylinder. After a short time the cylinder will be sufficiently heated and then the valve 95 and faucet 96 should be closed and the valve 92 opened, when the steam will pass through the pipe 77, inlet 43, chamber 44, and port 45 and operate the engine in the manner above described. It will be seen that the pipes 93 and 94 provide for the admission of steam to the cylinder, not only to heat the cylinder, but for any other purpose that may be desired.

From the above it will be seen that my invention provides means for imparting rotary motion to pistons and a shaft by the active force of an elastic fluid, such as steam, and afterward by the expansion or elasticity of said fluid and whereby such pistons and the shaft will be caused to revolve freely and uniformly and with a minimum of resistance. It will also be seen that my invention provides very simple means for rotating the pistons in either direction, as desired, and of preventing their rotation in one direction while they are rotated in the opposite direction. Also by reason of the peculiar arrangement of the different working parts, ports, and passages the engine is automatically packed by the expansive fluid.

My invention in its broader aspects is not limited to the precise construction shown and described nor to the precise construction by which it may be carried into effect, as many changes other than those suggested may be made therein without departing from the main principles of my invention.

What I claim as new, and desire to secure by Letters Patent, is—

1. In a rotary engine, two or more radial pistons journaled concentrically with the shaft and in the cylinder, and adapted to revolve in the same, and each piston adapted before reaching the end of its stroke to push the one ahead of it on its initial movement, and means within the cylinder or piston-casing for locking each piston to the shaft after its initial movement, and of unlocking each piston before said initial movement, whereby the shaft is alternately locked with said pistons and is thereby rotated.

2. In a rotary engine, two or more radial pistons journaled concentrically with the shaft and in the cylinder, and adapted to revolve in the same, and each piston adapted before reaching the end of its stroke to push the one ahead of it on its initial movement, and means within the cylinder or piston-casing for automatically locking each piston to the shaft after its initial movement, and of unlocking each piston before said initial movement, whereby the shaft is alternately locked with said pistons and is thereby rotated.

3. In a rotary engine, two or more radial pistons journaled concentrically with the shaft and in the cylinder, and adapted to revolve in the same, and to alternately impart rotary motion to the shaft, means for admitting with force an elastic fluid within the cylinder to one side or the other of said pistons, means for shutting off said fluid from said action at any desired point, and means secured to said pistons for operating said shutting-off means, whereby said pistons are first driven by the active force of such fluid, and then continued on their course by the elastic force of such fluid.

4. In a rotary engine, two or more radial pistons journaled concentrically with the shaft and in the cylinder, and adapted to revolve in the same, and to alternately impart rotary motion to the shaft, means for admitting live steam, within the cylinder to one side or the other of said pistons, means for shutting off the steam from said action at any desired point, and means secured to said pistons for operating said shutting-off means, whereby said pistons are first driven by the active force of the steam and then continued on their course by the expansive force of the steam.

5. In a rotary engine, two or more radial pistons journaled concentrically with the shaft and in the cylinder, and adapted to revolve in the same, and each piston adapted before reaching the end of its stroke to push the one ahead of it on its initial movement, means for locking the pistons to the shaft, and means for causing entering elastic fluid to operate such mechanism to lock each piston to the shaft after its initial movement, and to unlock each piston before said initial movement, whereby the shaft is alternately locked with said pistons and is thereby rotated.

6. In a rotary engine, two or more radial pistons journaled concentrically with the shaft and in the cylinder, and adapted to revolve in the same, and to alternately impart rotary motion to the shaft, an inlet-port in the cylinder for the admission of an elastic fluid, to one side or the other of said pistons, a valve to said port, means for operating said valve to open said port about the beginning of the movement of the pistons, and means for operating the valve to close the port at any desired point in its revolution, whereby the active entering force of said fluid may enter the cylinder and drive the pistons, and afterward be shut in the cylinder, and caused to force the pistons farther by the elastic force of the fluid, and means for causing each piston before reaching the end of its stroke to push the one ahead of it on its initial movement.

7. In a rotary engine, two or more radial pistons journaled concentrically with the shaft and in the cylinder, and adapted to revolve in the same, and to alternately impart rotary motion to the shaft, an inlet-port in the cylinder for the admission of an elastic fluid to one side or the other of said pistons, a valve to said port, means for operating said valve to open said port before the beginning of the movement of the pistons, means for operating the valve to close the port at any desired point in its revolution, whereby the active entering force of said fluid may enter the cylinder and drive the pistons, and afterward be shut in the cylinder and caused to force the pistons farther by the elastic force of the fluid, and means for causing each piston before reaching the end of the stroke to push the one ahead of it on its initial movement and means for exhausting the fluid from the cylinder.

8. In a rotary engine, two or more radial pistons journaled concentrically with the shaft and in the cylinder, and adapted to revolve in the same, and each piston adapted, before reaching the end of its stroke, to push the one ahead of it on its initial movement, means for locking the pistons to the shaft, means for causing the entering elastic fluid to operate such mechanism to lock each piston in the shaft after its initial movement, an inlet-port in the cylinder for the admission of an elastic fluid to one side or the other of said pistons, a valve to said port, means for operating said valve to open said port about the beginning of the movement of the pistons, means for operating the valve to close the port at any desired point in its revolution, whereby the active entering force of said fluid may enter the cylinder and drive the pistons, and afterward be shut in the cylinder and caused to force the pistons farther by the elastic force of the fluid, and means for exhausting the fluid to unlock the piston from the shaft, whereby said shaft may be operated by the other piston.

9. In a rotary engine, two or more radial pistons journaled concentrically with the shaft and in the cylinder, and adapted to revolve in the same, and each piston adapted, before reaching the end of its stroke, to push the one ahead of it on its initial movement, means for locking the pistons to the shaft, means for causing the entering elastic fluid to operate such mechanism to lock each piston in the shaft after its initial movement, an inlet-port in the cylinder for the admission of an elastic fluid to one side or the other of said pistons, a valve to said port, means for operating said valve to open said port about the beginning of the movement of the pistons, means for operating the valve to close the port at any desired point in its revolution, whereby the active entering force of said fluid may enter the cylinder and drive the pistons, and afterward be shut in the cylinder and caused to force the pistons farther by the elastic force of the fluid, means for exhausting the fluid from the cylinder, and means for exhausting the fluid to unlock the piston from the shaft, whereby said shaft may be operated by the other piston.

10. In a rotary engine, two or more radial pistons journaled concentrically with the shaft and in the cylinder, and adapted to revolve in the same, and to alternately impart rotary motion to the shaft, an inlet-port in the cylinder for the admission of an elastic fluid to one side or the other of said pistons, a valve to said port, means for operating said valve to open said port about the beginning of the movement of the pistons, means for operating the valve to close the port at any desired point in its revolution, whereby the active entering force of said fluid may enter the cylinder and drive the pistons, and afterward be shut in the cylinder and caused to force the pistons farther by the elastic force of the fluid, means for exhausting the fluid from the cylinder, and means for admitting a slight portion of the exhaust fluid in front of the cylinder, whereby the piston may, before reaching the end of its stroke, be cushioned, and then push the one ahead of it on its initial movement.

11. In a rotary engine, two or more radial pistons journaled concentrically with the shaft and in the cylinder, and adapted to revolve in the same, and to alternately impart rotary motion to the shaft, an inlet-port in the cylinder for the admission of an elastic fluid to one side or the other of said pistons, a slide-valve to said port, a slide, a slide-rod connected to said valve, bell-crank levers pivoted to said rod, cams connected with said pistons, an intermediate connection between said bell-crank levers and cams, and said cams arranged to operate said connections, bell-crank levers, slide rod and valve, to open the inlet-port about the beginning of the movement of the pistons, and to close said port at one period of the revolution of the pistons, whereby the active entering force of said fluid may enter the cylinder and drive the pistons, and afterward be shut in the cylinder, and caused to force the pistons farther by the elastic force of the fluid, and each piston adapted, before reaching the end of its stroke, to push the one ahead of it on its initial movement.

12. In a rotary engine, the combination with the shaft, of a radial piston in the cylinder, a device for locking the piston to the shaft, an inlet-port in the cylinder, and an inlet-passage extending from the outer periphery of the piston to said device, and arranged to register with said port in the cylinder about the beginning of the movement of the piston, whereby an elastic fluid may pass through said port and passage and operate the locking device to lock the piston to the shaft.

13. In a rotary engine, the combination with the shaft, of a radial piston in the cylinder, a device for locking the piston to the shaft, an inlet-port in the cylinder, an inlet-passage extending from the outer periphery of the piston to said device, and arranged to register with said port in the cylinder about the beginning of the movement of the piston, whereby an elastic fluid may pass through said port and passage and operate the locking device to lock the piston to the shaft, and means for closing said passage in the piston as soon as it has passed said port, whereby the elastic quality of the fluid will keep the locking device in the position to lock the piston to the shaft until the passage in the piston meets an outlet-port to enable the fluid to escape.

14. In a rotary engine, the combination with the shaft, of a radial piston in the cylinder, a device for locking the piston to the shaft, a movable device in the piston for operating said locking device, an inlet-port in the cylinder, and an inlet-passage extending from the outer periphery of the piston to said device, and arranged to register with said port in the cylinder about the beginning of the movement of the piston, whereby an elastic fluid may pass through said port and passage and operate the locking device to lock the piston to the shaft.

15. In a rotary engine, the combination with the shaft, of a radial piston in the cylinder, a device for locking the piston to the shaft, a movable device in the piston for operating said locking device, an inlet-port in the cylinder, an inlet-passage extending from the outer periphery of the piston to said device, and arranged to register with said port in the cylinder about the beginning of the movement of the piston, whereby an elastic fluid may pass through the port and passage and operate the locking device to lock the piston to the shaft, and means for closing said passage in the piston as soon as it has passed said port, whereby the elastic quality of the fluid will keep the locking device in the position to lock the piston to the shaft, until the passage in the piston meets an outlet-port to enable the fluid to escape.

16. In a rotary engine, the combination with the shaft, of a radial piston in the cylinder, a device for locking the piston to the shaft, two passages extending from the outer periphery of the piston to said device, and corresponding ports in the cylinder with which said passages are arranged to register about the beginning of the movement of the piston, and means for closing the outlet of one of said ports and passages, while the other is open, whereby an elastic fluid may pass only through the open port and passage and operate the locking device to lock the piston to the shaft, when the piston is to be moved in the direction that the elastic fluid meets the locking device.

17. In a rotary engine, the combination with the shaft, of a radial piston in the cylinder, a device for locking the piston to the shaft, a movable device in the piston for operating said locking device, two passages extending from the outer periphery of the piston to said device, and corresponding ports in the cylinder with which said passages are arranged to register about the beginning of the movement of the piston, means for closing the outlet of one of said ports and passages, while the other is open, whereby an elastic fluid may pass only through the open port and passage and operate the locking device to lock the piston to 18. In a rotary engine, the combination with the shaft, of a radial piston in the cylinder, a device for locking the piston to the shaft, a movable device in the piston for operating said locking device, two passages extending from the outer periphery of the piston to said device, and corresponding ports in the cylinder with which said passages are arranged to register about the beginning of the movement of the piston, means for closing the outlet of one of said ports and passages, while the other is open, whereby an elastic fluid may pass only through the open port and passage and operate the locking device to lock the piston to the shaft, when the piston is to be moved in the direction that the elastic fluid meets the locking device, and means for closing said passage in the piston as soon as it has passed said port, whereby the elastic quality of the fluid will keep the locking device in the position to lock the piston to the shaft until the passage in the piston meets an outlet-port to enable the fluid to escape.

19. In a rotary engine, the combination with the shaft, of a radial piston in the cylinder, a device for locking the piston to the shaft, two passages extending from the outer periphery of the piston to said device, and corresponding ports in the cylinder with which said passages are arranged to register about the beginning of the movement of the piston, valves for closing and opening said ports, a device for locking the pistons from movement in one direction, and means connected with said device for operating it and said valves to simultaneously lock or unlock the piston, close one port and open the other, all as and for the purposes set forth.

20. In a rotary engine, a radial piston, constructed for concentric connection with the shaft and provided with a recess or chamber near its center of revolution, a device in said chamber for locking the piston to the shaft, and inlet and exhaust passages leading from the outer surface of said piston to said chamber, whereby an elastic fluid may pass through one of said passages to operate said locking device, to lock or unlock the same, and permit of the withdrawal of the exhaust of said fluid from said chamber through the other passage.

21. In a rotary engine, a radial piston constructed for concentric connection with the shaft and provided with a recess or chamber near its center of revolution, a device in said chamber for locking the piston to the shaft, a gate suspended within said chamber, and with its free end engaging with said locking device, inlet and exhaust passages leading from the outer surface of said piston to said chamber on opposite sides of said gate, whereby an elastic fluid may pass through one of said passages to operate the gate to lock or unlock the device and permit of the withdrawal of the exhaust of said fluid from said chamber through the other passage.

22. In a rotary engine, in combination with a radial piston constructed for concentric connection with the shaft, two rings secured respectively to the opposite ends of the piston, and adapted to surround the shaft and revolve in annular guides in the piston-heads, all substantially as and for the purposes set forth.

23. In a rotary engine, in combination with a radial piston constructed for concentric connection with the shaft, two rings secured respectively to the opposite ends of the piston, and adapted to surround the shaft and revolve in annular guides in the piston-heads, and said rings provided with cams for operating the inlet-valve of the engine, substantially as and for the purposes set forth.

24. In a rotary engine, in combination with a radial piston constructed for concentric connection with the shaft, two rings secured respectively to the opposite ends of the piston, and adapted to surround the shaft and revolve in annular guides in the piston-heads, and said rings provided with adjustable cams for operating the inlet-valve of the engine, substantially as and for the purposes set forth.

25. In combination with the shaft of a rotary engine, a radial piston journaled concentrically with said shaft, and provided with a recess or chamber adjoining said shaft, a device in said chamber bearing on said shaft for locking the piston to the same, and inlet and exhaust passages leading from the outer surface of said piston to said chamber, whereby an elastic fluid may pass through one of said passages to operate said locking device to lock the same to or unlock it from the shaft, and permit of the withdrawal of said fluid from said chamber through the other passage.

26. In combination with the shaft of a rotary engine, a radial piston journaled concentrically with said shaft, and provided with a recess or chamber adjoining said shaft, a device in said chamber bearing on said shaft for locking the piston to the same, a gate suspended within said chamber, and with its free end engaging with said locking device, inlet and exhaust passages leading from the outer surface of said piston to said chamber on opposite sides of said gate, whereby an elastic fluid may pass through one of said passages to operate the gate to lock the same, or to unlock it from the shaft, and permit of the withdrawal of said fluid from said chamber through the other passage.

27. A device for locking a rotary piston to its shaft, and for unlocking it from the same, said device having two opposite convex sides, and a concave side for resting on the periphery of the shaft, or upon a sleeve secured to the same, whereby the shaft may revolve independently, and when one of the convex sides is turned into a depression of the shaft, the piston will be locked to it, and cause it to revolve.

28. A device for locking a rotary piston to its shaft and for unlocking it from the same, said device having two opposite convex sides, and a concave side for resting on the periphery of the shaft, or upon a sleeve secured to the same, and a recess opposite said concave side for the engagement of an operating device, whereby the shaft may revolve independently, and when one of the convex sides is turned into a depression of the shaft, the piston will be locked to it, and cause it to revolve.

29. In a rotary engine, in combination with the shaft, or with a sleeve secured thereto, and said shaft or sleeve provided with longitudinal grooves, a radial piston journaled concentrically with said shaft and provided with a recess or chamber adjoining said shaft, a locking device in said chamber having two opposite convex sides and a concave side for resting on the periphery of the shaft or sleeve, whereby the shaft may revolve independently, and when one of the convex sides is turned into one of said grooves, the piston will be locked to the shaft, and cause it to revolve.

30. In a rotary engine, the combination of two rotary pistons, each provided with leg portions at its ends journaled loosely on the shaft, means for removably securing each piston to said shaft, and the legs of one piston riding on the corresponding legs of the other piston, whereby the pistons will be prevented from passing each other, but will permit of either piston coming into contact with the other before it has completed its revolution.

31. In combination with the inlet-pipe of a rotary engine, an auxiliary pipe leading from said inlet-pipe above the inlet-valve of the engine, to the lower portion of the cylinder, means for directing the steam away from the main cylinder-valve and through the auxiliary pipe, and means for opening and closing the lower portion of said pipe, whereby steam or other hot elastic fluid may be caused to enter the cylinder at the bottom and heat the cylinder, and means be provided for withdrawing the water of condensation from the cylinder.

In testimony whereof I have signed my name to this specification in the presence of two subscribing witnesses.

THOMAS S. HUNTINGTON.

Witnesses:
RICHARD F. OLPHERTS,
PENNINGTON HALSTED.